(12) United States Patent
Ulasen et al.

(10) Patent No.: US 12,531,002 B1
(45) Date of Patent: Jan. 20, 2026

(54) SYSTEMS AND METHODS FOR DETECTION OF THE PRESENCE OF A PERSON IN FRONT OF A DISPLAY WITH A CAMERA

(71) Applicants: Constructor Technology AG, Schaffhausen (CH); Constructor Education and Research Genossenschaft, Schaffhausen (CH)

(72) Inventors: Sergey Ulasen, Singapore (SG); Rasilia Rakhmatulina, Sofia (BG); Nikita Zherebtsov, Sofia (BG); Andrey Adashchik, Istanbul (TR); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

( * ) Notice: Subject to any disclaimer, the term of this patent is extended or adjusted under 35 U.S.C. 154(b) by 0 days.

(21) Appl. No.: 19/004,064

(22) Filed: Dec. 27, 2024

(51) Int. Cl.
*G09G 3/20* (2006.01)
*G06V 40/10* (2022.01)

(52) U.S. Cl.
CPC ........ *G09G 3/2003* (2013.01); *G06V 40/103* (2022.01); *G09G 2320/0646* (2013.01); *G09G 2320/0666* (2013.01); *G09G 2340/04* (2013.01); *G09G 2354/00* (2013.01); *G09G 2360/145* (2013.01); *G09G 2370/16* (2013.01)

(58) Field of Classification Search
CPC ........ G09G 3/2003; G09G 2320/0646; G09G 2320/0666; G09G 2340/04; G09G 2354/00; G09G 2360/145; G09G 2370/16; G06V 40/103
See application file for complete search history.

(56) References Cited

U.S. PATENT DOCUMENTS

| | | | |
|---|---|---|---|
| 2014/0125575 A1* | 5/2014 | Samanta Singhar | ... G06F 3/038 345/156 |
| 2017/0374335 A1* | 12/2017 | Hsu | ........................ H04N 23/74 |
| 2022/0245964 A1* | 8/2022 | Levinski | ............... G06V 10/141 |
| 2022/0309283 A1* | 9/2022 | Orevi | .................... G06V 40/193 |
| 2023/0186685 A1* | 6/2023 | Zhang | .................... G06V 10/24 382/100 |

* cited by examiner

*Primary Examiner* — Premal R Patel
(74) *Attorney, Agent, or Firm* — ArentFox Schiff LLP; Michael Fainberg

(57) ABSTRACT

Disclosed herein are systems and methods for detecting a presence of a person in front of a display with a camera based on a reflection detection. In one aspect, an exemplary method includes obtaining, using a camera, a video stream of a user in front of the display. The method also includes changing a brightness and color characteristics of an object. The method further includes obtaining changes in a brightness and a color temperature of at least one surface on a face of the user from the video stream. The method further includes based on a determination that the obtained changes in brightness and color temperature of surfaces on the face of the user do not correspond to the brightness and color temperature of the object within the brightness threshold and the color temperature threshold, determining that the user is not in front of the display.

20 Claims, 13 Drawing Sheets

SYSTEMS AND METHODS FOR DETECTION OF THE PRESENCE OF A PERSON IN FRONT OF A DISPLAY WITH A CAMERA

FIELD OF TECHNOLOGY

The present disclosure relates to the field of an online presence verification technique, and, more specifically, to systems and methods for detecting a presence of a person in front of a display with a camera based on a reflection detection.

BACKGROUND

In recent years, advancements in artificial intelligence have enabled the creation of highly realistic deepfakes and computer-generated faces, leading to a growing concern about online identity deception. Deepfakes use sophisticated machine learning algorithms to manipulate audio and video, allowing individuals to convincingly mimic someone else's appearance or voice. Similarly, AI-generated faces, created through technologies like GANs (Generative Adversarial Networks), produce photorealistic images of non-existent individuals, often indistinguishable from real people. These tools are increasingly exploited by bad actors to impersonate others, spread misinformation, commit fraud, or manipulate social interactions. The accessibility of these technologies has amplified their impact, posing significant challenges to online trust and digital security.

In addition, examinations are now commonly taken on computers, offering convenience and accessibility for both students and institutions. These computer examinations are conducted through specialized software or platforms that allow students to take tests from remote locations. They often include features like automated proctoring, time tracking, and instant grading. However, this shift to computer examinations has also introduced new opportunities for cheating. Students might use unauthorized resources such as notes, search engines, or communication tools like messaging apps during the exam. Other students may simply have someone else pretend to be the student and take the computer examination for the student under the student's login credentials. In other cases, in examinations with video proctoring, a pre-recorded video loop of the candidate sitting still or pretending to take the exam could be played while the real exam is being taken by someone else. These methods exploit the weaknesses in online proctoring systems, especially in cases where human proctors or artificial intelligence (AI) may not be able to detect subtle signs of cheating. To counteract these tactics, some online examination platforms are increasingly using sophisticated AI, biometric verification, and more rigorous promoting techniques.

SUMMARY

To address the shortcoming of online personal presence verification systems, the present disclosure describes an implementation of a personal presence control system for detecting a presence of a person in front of a display with a camera based on a reflection detection. Some of the technical improvements of the present disclosure is the ability to verify that a person that is reportedly in front of a computer and in front of the camera is actually the same individual that is in front of the camera. In addition, the present disclosure describes utilizing machine learning models to measure changes in a brightness and color temperature on a face of a user in a video clip when the user is in front of a computer and captured in a live stream by a camera. Furthermore, the present disclosure describes an implementation of an online proctoring pr presence system using a webcam and a display from a computer.

In one exemplary aspect, a method for detecting a presence of a person in front of a display with a camera based on a reflection detection is disclosed, the method comprises: obtaining, using a camera pointed at a user, a video stream of a user in front of the display; changing, on the display of a computer, a brightness and color characteristics of an object displayed on the display; in response to changing the brightness and color characteristics of the object displayed on the display, obtaining changes in a brightness and a color temperature of at least one surface on a face of the user from the video stream; based on a determination that the obtained changes in the brightness and color temperature of surfaces on a face of the user correspond to the brightness and color temperature of the object within a brightness threshold and a color temperature threshold, determining that the user is in front of the display; and based on a determination that the obtained changes in brightness and color temperature of surfaces on the face of the user do not correspond to the brightness and color temperature of the object within the brightness threshold and the color temperature threshold, transmitting a message that the user is not in front of the display.

In some aspects, the techniques described herein relate to a method, further comprising: cropping portions of the face of the user from the obtained video stream, wherein the cropped portions correspond to surfaces of at least a left eye, a right eye, a portion of a forehead, a left cheekbone, a right cheekbone, a nose bridge, or a chin, and in response to changing the brightness and color characteristics of the object displayed on the display, obtaining changes in the brightness and the color temperature of at least one of the cropped surfaces on the face of the user from the video stream.

In some aspects, the techniques described herein relate to a method, further comprising: determining whether the obtained changes in brightness and color temperature of the surfaces on the face of the user correspond to the brightness and color temperature of the object within the brightness threshold and the color temperature threshold using a trained machine learning model.

In some aspects, the techniques described herein relate to a method, wherein the machine learning model is trained by: training the machine learning model to determine changes in the brightness and the color temperature on the surfaces on the face of the user using a labeled dataset containing videos of faces of people under different lighting conditions and varying color temperatures.

In some aspects, the techniques described herein relate to a method, wherein the machine learning model corresponds to a SIAMESE neural network, a regression model, an autoencoder with supervised loss, and a convolutional neural network (CNN) trained to learn spatial patterns.

In some aspects, the techniques described herein relate to a method, further comprising: before displaying the object, performing an calibration of the brightness and color temperature of the surfaces on the face of the user by obtaining the brightness and the color temperature of the at least one surface on the face of the user from the obtained video stream as a baseline measurement.

In some aspects, the techniques described herein relate to a method, further comprising: displaying the object on the display of the computer at an initial brightness and color; changing the brightness and color during a time period; and in response to displaying the object during the time period, obtaining the changes in the brightness and the color of surfaces on a face of the user from the obtained video stream from a same time period.

In some aspects, the techniques described herein relate to a method, wherein the object corresponds to at least one of: a blue shape, a red shape, a yellow shape, a white shape, a shape with multiple colors, or a shadowed screen.

In some aspects, the techniques described herein relate to a method, wherein changing the brightness and color characteristics of the object displayed on the display is based at least in part on pulse-width modulation techniques.

In some aspects, the techniques described herein relate to a method, further comprising: based on a determination that the obtained changes in brightness and color temperature of surfaces on the face of the user do not correspond to the brightness and color temperature of the object within the brightness threshold and the color temperature threshold, determining that the user is using a deepfake by generating a computer generated face.

According to one aspect of the disclosure, a system is provided for detecting of presence of person in front of display with camera based on reflection detection, the system comprising at least one memory; and at least one hardware processor coupled with the at least one memory and configured, individually or in combination to: obtain, using a camera pointed at a user, a video stream of a user in front of the display; change, on the display of a computer, a brightness and color characteristics of an object displayed on the display; in response to changing the brightness and color characteristics of the object displayed on the display, obtain changes in a brightness and a color temperature of at least one surface on a face of the user from the video stream; based on a determination that the obtained changes in the brightness and color temperature of surfaces on a face of the user correspond to the brightness and color temperature of the object within a brightness threshold and a color temperature threshold, determine that the user is in front of the display; and based on a determination that the obtained changes in brightness and color temperature of surfaces on the face of the user do not correspond to the brightness and color temperature of the object within the brightness threshold and the color temperature threshold, transmit a message that the user is not in front of the display.

In one exemplary aspect, a non-transitory computer-readable medium is provided storing a set of instructions thereon for detecting of presence of person in front of display with camera based on reflection detection, wherein the set of instructions comprises instructions for: obtaining, using a camera pointed at a user, a video stream of a user in front of the display; changing, on the display of a computer, a brightness and color characteristics of an object displayed on the display; in response to changing the brightness and color characteristics of the object displayed on the display, obtaining changes in a brightness and a color temperature of at least one surface on a face of the user from the video stream; based on a determination that the obtained changes in the brightness and color temperature of surfaces on a face of the user correspond to the brightness and color temperature of the object within a brightness threshold and a color temperature threshold, determining that the user is in front of the display; and based on a determination that the obtained changes in brightness and color temperature of surfaces on the face of the user do not correspond to the brightness and color temperature of the object within the brightness threshold and the color temperature threshold, transmitting a message that the user is not in front of the display.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Like reference numbers and designations in the various drawings indicate like elements.

DETAILED DESCRIPTION

Exemplary aspects are described herein in the context of a system, method, and computer program product for detecting a presence of a person in front of a display with a camera based on a reflection detection. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

During an online session that may require identity verification or an online examination, it is essential to determine whether a user captured by a camera for monitoring and/or verification purposes is actually the person sitting in front of a computer. As an example, the present disclosure may protect against "deepfakes" being used in real-time during an online connection where an impersonator may pretend to be another individual by overlaying a computer-generated face as a "mask" (e.g., united with real neck) that maps onto the impersonator's movements, creating realistic lip-synching and expressions. As another example, verifying that the person in front of the camera is the enrolled student ensures that the individual taking the exam is the one who is taking the examination. In this way, cheating may be prevented by detecting whether someone else is taking the examination on the computer on behalf of the student.

The present disclosure describes various aspects of detecting a presence of a person in front of a display with a camera based on a reflection detection. One aspects involves providing a colored reflection to a user's face in response to displaying an object on a monitor that the user is viewing. A second aspect involves determining whether the user is attempting to pretend to be someone else (or cheat) by measuring changes to a brightness and color temperature on the face of the user in response to changing at least a brightness or color characteristic of the object displayed on the monitor. A third aspect involves training machine learning models to determine changes in the brightness and the color temperature of the surface on the face of the user while the user is in front of the computer.

Turning now to the figures, example aspects are depicted with reference to one or more components described herein, where components in dashed lines may be optional.

Figure 1:
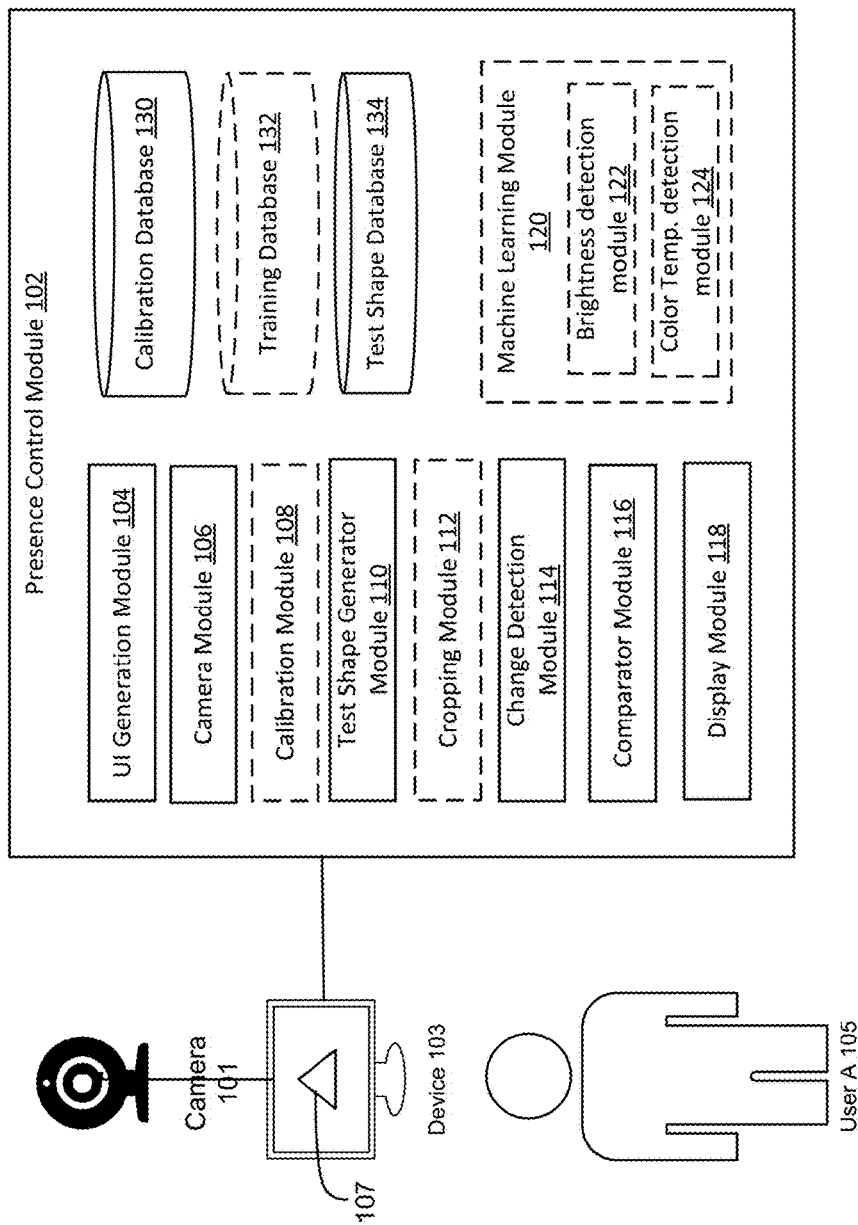
FIG. 1 is a block diagram illustrating a system for detecting a presence of a person in front of a display with a camera based on a reflection detection according to aspects of the present disclosure.

FIG. 1 is a block diagram illustrating a system 100 configured to detect a presence of a person in front of a display with a camera based on a reflection detection. In one aspect, the components of system 100 may be implemented on computer systems, such as that shown in FIG. 7.

The system 100 may be used to implement a real-time monitoring system that detects the presence of a person in front of a display with a camera by detecting changes in the brightness and color temperature of the surface of the face of the user from a camera 101 in response to displaying objects that change brightness or color characteristics on a computing device 103. Generally, the presence control module 102 is configured to provide and display an object 107 (e.g., a colored shapes, which will be described in more detail in FIGS. 3A-4D) on a display that will affect the brightness and color temperature of a user's face captured by a camera 101 on the computing device 103. This provide a way to implement a presence control module for detecting whether the correct person is sitting in front of the device 103. In particular, the presence control system is configured to detect whether the person (e.g., user A 105) who is in front of the camera 101 (e.g., captured in videos by the camera 101) is actually the person sitting in front of the computer due to detecting a change in brightness and color temperature of the person's face (e.g., reflected off their face) in response to viewing the object 107 displayed on the screen.

In one aspects, the system 100 includes at least a computing device 103, a camera 101 coupled to the computing device 103, and a presence control module 102. The presence control module 102 will be configured to detect a presence of a person in front of the display with the camera by determining whether the person monitored by the camera 101 is actually the person in front of the computing device 103. In some aspects, the camera 101 may be coupled to the device 103 as a webcam. In some aspects, the camera 101 may communicate directly with the presence control module 102 and be mounted in a room to capture the test taking environment. As an example, the presence control module 102 may be hosted on a cloud server or allocated at a local device (e.g., such as the computing device 103).

In some aspects, the presence control module 102 may contain at least a UI generation module 104, a camera module 106, an optional calibration module 108, a test shape generator module 110, an optional cropping module 112, a change detection module 114, a comparator module 116, a display module 118, and an optional machine learning module 120 including a brightness detection module 122 and/or a color temperature detection module 124, a comparator module 116. The presence control module 102 may be connected to at least a calibration database 130, a training database 132, or a test shape database 134. In some aspects, these databases may be hosted on the computing device 103 or a local machine. In some aspects, these databases may be hosted on a cloud server. In some aspects, the presence control module 102 may generate a UI for display, which may be part of a client application associated with the presence control module 102.

The computing device 103 may execute a UI generation module 104 to implement a UI for display on the computing device 103 that is configured to receive input from the computing device 103, optionally administer the online examination to the user A 105, and display an object 107. In some aspects, the UI generation module 104 generates a single UI and layout and components of the UI elements (e.g., menus, buttons, forms, grids, etc.) based on predefined rules, data models, or templates. In some aspects, the UI generation module 104 may also be configured to automatically adjust the UI elements based on the content or data that it needs to display such as adapting a form to input fields or displaying a list of items. In some aspects, the UI generation module 104 may also be configured to adapt the UI to different screen sizes and resolutions by making sure that the UI works well across various devices.

The computing device 103 may execute a camera module 106 configured to detect and monitor the presence of people within a certain area (e.g., in front of the computing device 103). The camera module 106 captures visual data in the form of images or video clips, which is then processed by the presence control module 102 to determine whether someone is present in the monitored space and for measuring parameters on particular portions of the face of the user in the video. In particular, the camera module 106 may be configured to obtain, using the camera 101 pointed at a user (e.g., user A 105), a video stream of a user sitting in front of the computing device 103. Advanced algorithms (e.g., computer vision, machine learning) are used to detect the presence of people by recognizing shapes, movement, or patterns that signify human activity. This module serve as the interface layer that facilitates communication between the camera 101 and the presence control module 102.

The computing device 103 may execute an optional calibration module 108 to calibrate and measure a brightness and color temperature of a user A 105 being captured by the camera 101 as a baseline measurements before an online session or online examination process begins. In particular, the calibration module 108 is configured to measure and determine calibration measurements corresponding to parameters (e.g., a brightness and color temperature) of the user A 105 from the captured video streams while the user A 105 is sitting in front of a display of a computing device 103 (e.g., without displaying any colored shapes). The initial calibration measurements may be stored in a calibration database 130 in order to detect any changes in the parameters in response to the computing device 103 generating and displaying different objects 107 during the online session (e.g., examination) to ensure that user A 105 is indeed the person present during the online session on the computing device 103.

In some aspects, the calibration module 108 may define meaningful features that capture the brightness and color characteristics of a user. These features may be input into the optional machine learning module 120. For example, the features may include at least a brightness feature, a color feature, or a temporal changes. The brightness feature may calculate the average brightness (or other statistics like variance) for each frame or image using the grayscale or Hue, Saturation, Value (HSV) channel. The color feature may calculate the dominant colors or mean hue and saturation for color information. As an example, a common technique may be to create histograms for the H channel or RGB values. For videos, the changes in brightness and color may be tracked over time by computing the difference between consecutive frames or applying techniques like optical flow to capture variations in lighting and color.

The computing device 103 may execute a test shape generator module 110 configured to display, on the display of the computing device 103, an object 107 with a brightness and a color different from any other shapes displayed on the display. In some aspects, the object 107 may be displayed with a static brightness and color. In some aspects, the object 107 may be displayed with a dynamic brightness and color that changes in real-time. In some aspects, the object 107 may correspond to at least one of: a blue shape, a red shape, a yellow shape, a white shape, a shape with multiple colors, or a shadowed screen.

The computing device 103 may execute an optional cropping module 112 configured to crop portions of the face of the user from the obtained video stream and/or images. Specifically, the cropping module 112 may be configured to crop and distinguish between portions corresponding to surfaces of at least a left eye, a right eye, a portion of a forehead, a left cheekbone, a right cheekbone, or a nose bridge of the user. The cropping process will be explained in more detail with respect to FIGS. 3A-3E.

The computing device 103 may execute a change detection module 114 configured to calculate a change in the brightness and/or color of a face of a user in response to displaying an object 107 on the display of the computing device 103. The idea is that the brightness and/or color temperature of the object 107 will be reflected off the face of the user being captured by the camera 101. The change detection process will be explained in more detail in FIGS. 5-6.

As will be explained in more detail in FIGS. 3A-3E, if changes in the brightness and/or color temperature of the user's face correlates with the appearance or changes of the object 107 on the screen due to a reflection of the object 107 on the face of the user, then the presence control module 102 may determine that the same person being captured by the camera 101 is taking the test on the computing device 103.

As will be explained in more detail in FIGS. 4A-4D, if changes in the brightness and/or color temperature of the user's face do not correlate with the appearance or changes of the object 107 on the screen, then the presence control module 102 may determine that another person (e.g., not user A 105) is being captured by the camera 101 and a cheating event is detected since the correct person is not being captured by the camera 101.

The computing device 103 may execute a comparator module 116 configured to detect changes in brightness and color temperature of surfaces of the face of the user in the obtained video clips or images and determine whether the detected changes in brightness and color temperature correspond to a brightness and color temperature of a displayed colored shape. In some aspects the comparator module 116 may correspond to a SIAMESE neural network, a regression model, an autoencoder with supervised loss, and a convolutional neural network (CNN) trained to learn spatial patterns. The comparator module 116 will be described in more detail in FIG. 5.

The computing device 103 may execute a display module 118. The display module 118 may be configured to generate and display the online session to the user. Generally, the display module 118 is responsible for managing and rendering the visual components of the user interface by handling the presentation of information to the user, ensuring that data and controls are displayed correctly and consistently across the UI.

In some aspects, the display module 118 is configured to render or draw all the elements of the UI, such as windows, buttons, text fields, menus, icons, images, and other components. In some aspects, the display module 118 is configured out update the UI when the data changes or user interactions occur (e.g., clicking a button or typing in a text box) such that the display module updates the UI accordingly. This could mean refreshing a portion of the screen, changing the state of a button, or displaying new data. In other words, the display module 118 may be considered the "view" part of a model-view-controller (MVC) or similar design pattern. It serves as the layer that presents data to the user and receives input to and from the computing device 103.

In some aspects, the computing device 103 may execute an optional machine learning module 120 that includes a brightness detection module 122 and/or a color temperature detection module 124. The machine learning module 120 is trained to analyze the videos of the user (e.g., user A 105), as well as other known sources (e.g., stored in calibration database 130, training database 132) to obtain changes in a brightness and a color temperature of at least one surface on a face of the user from the video or images.

In some aspects, the brightness detection module 122 and/or a color temperature detection module 124 may contain specific trained machine learning modules. There are several possible approaches that may be implemented using computer vision and machine learning models such as a neural network (e.g., a convolutional neural network (CNN) and/or a recurrent neural network (RNN)). A neural network is a type of machine learning process that uses interconnected nodes or neurons in a layered structure that resembles the human brain. The neural networks create an adaptive system that computers use to learn from their mistakes and improve continuously by comprehending unstructured data and make observations without explicit training. With neural networks, computers may distinguish and recognize images similar to humans. However, the neural networks in the trained ML model for brightness and trained ML model for color temperature must first go through training to teach the neural networks to perform their respective specific tasks.

The machine learning module 120 may comprise one or more neural networks, which are a class of machine learning models inspired by the structure and functioning of the human brain. They consist of interconnected nodes, called neurons or artificial neurons, organized into layers. Neural networks are capable of learning complex patterns and representations from data. The neural network executed by machine learning module 120 may be one of the following: transformer neural network, convolution neural network (CNN), recurrent neural network (RNN), long short-term memory (LSTM) network, gated recurrent unit (GRU) network, autoencoder, generative adversarial network (GAN). CNNs are effective for image-related tasks because CNNs may automatically learn spatial hierarchies of features from the input images. For videos, RNNs or Long Short-Term Memory (LSTM) networks can be used to capture temporal dependencies between frames. In some aspects, a hybrid model may be used by combining CNNs for spatial feature extraction and RNNs for temporal analysis.

A transformer is a deep learning architecture used in large language models (LLMs). The transformer has an encoder/decoder structure with numerous stacked multi-head attention layers and feed forward network layers. This architecture allows the model to process and generate text effectively, capturing long-range dependencies and contextual information. Transformer are well-suited for tasks like natural language processing, and image classification and generation. Common examples of transformer models are generative pre-trained transformer (GPT) and Bidirectional Encoder Representations from Transformers (BERT).

A CNN is specialized for processing grid-like data, such as images, and employs convolutional layers to learn spatial hierarchies of features, reducing the need for manual feature engineering. CNNs are well-suited for tasks like image classification, object detection, and image generation.

An autoencoder is a type of neural network used for unsupervised learning and dimensionality reduction, and consists of an encoder that compresses input data into a lower-dimensional representation (encoding) and a decoder that reconstructs the original input from the encoding.

A GAN comprises a generator and a discriminator trained simultaneously through adversarial training. The generator aims to generate realistic data, while the discriminator tries to distinguish between real and generated data. A GAN is widely used for image and content generation tasks.

For scene understanding/computer vision tasks such as detecting a change in brightness or color parameters (e.g., detecting a brightness and/or color temperature changes) within a video, an untrained machine learning model in the brightness detection module 122 and/or the color temperature detection module 124 will first analyze the images from the training dataset (e.g., training database 132) to identify a "baseline" measurement for a brightness and/or color temperature of a user (e.g., user A 105) sitting in front of the computing device 103. As an example, the training dataset may include labeled dataset containing images or videos of faces of different people under different lighting conditions and varying color temperature.

During training of the brightness detection module 122 and/or the color temperature detection module 124, the training dataset will comprise images of faces of people that are input through an untrained machine learning model in the brightness detection module 122 and/or the color temperature detection module 124. The results from the untrained machine learning models are then compared with known data set results (e.g., people training set or object training set) using the corresponding people and object labels identifying brightness and color temperature at certain portions of a face of the user in the images. It should be noted that the input to the brightness detection module 122 and/or the color temperature detection module 124 will be the images from the training dataset.

For every input training sample from the training dataset, the neural network from the brightness detection module 122 and/or the color temperature detection module 124 will produce a prediction consisting of values representing the probability that a detected change in the brightness and/or color temperature has passed a threshold in response to displaying an object 107. The output with the highest probability determines the predicted pass or fail label. A class label for each input image is used to compute a loss (e.g., loss function).

The brightness detection module 122 and/or the color temperature detection module 124 then uses a loss function that quantifies the error between the predicted output and the ground truth for a given training sample. In other words, the loss function can be used to guide the learning process by updating the network weights in a way that improves the accuracy of future predictions. This process may continue until the difference between the prediction and the correct targets is minimal. In some examples, an appropriate loss function, such as Mean Squared Error (MSE) for regression tasks (e.g., predicting brightness levels) or a Cross-Entropy Loss for classification tasks (e.g., detecting specific color changes).

In some aspects, an optimizer such as Adam or SGD may be used to train the models in the brightness detection module 122 and/or the color temperature detection module 124. In some aspects, the data may be split into training, validation, and test sets. In these aspects, the models from the brightness detection module 122 and/or the color temperature detection module 124 are trained on the training dataset and then validated by the validation sets in order to tune hyperparameters.

Once the neural network is trained (e.g., inference), the brightness detection module 122 and/or the color temperature detection module 124 may detect changes in brightness and/or color temperature in response to displaying different types of colored shapes (e.g., object 107) during the online session. Specifically, the brightness detection module 122 and/or the color temperature detection module 124 contains a trained neural network configured to identify and detect changes in brightness and/or color temperature when different colored shapes are displayed on the display of the computing device 103. As such, the brightness detection module 122 and/or the color temperature detection module 124 is trained to detect at least one difference in brightness or color temperature after displaying a object 107 on the display.

During inference, the trained neural network model from the brightness detection module 122 and/or the color temperature detection module 124 does not re-evaluate or adjust the layers of the neural network based on the results. Instead, the inference applies knowledge from the trained neural network and uses it to infer a result (e.g., whether a detection in brightness or color temperature exceeds a predetermined threshold). Accordingly, when a new unknown dataset (e.g., video stream) is input through the trained neural network in the brightness detection module 122 and/or the color temperature detection module 124, the trained neural network outputs a prediction of whether a change in brightness and/or color temperature is detected based on predictive accuracy of the neural network.

In some examples, the trained models from the brightness detection module 122 and/or the color temperature detection module 124 may not be neural networks. Instead, the trained models may correspond to any simple thresholding or statistical models with the ability to detect a different in brightness or color temperature between frames such that if the difference exceeds a certain threshold then a change is detected. As another example, the trained models may use a moving average over time to smooth changes and detect significant deviations in brightness or color temperature within the videos.

Figure 2:
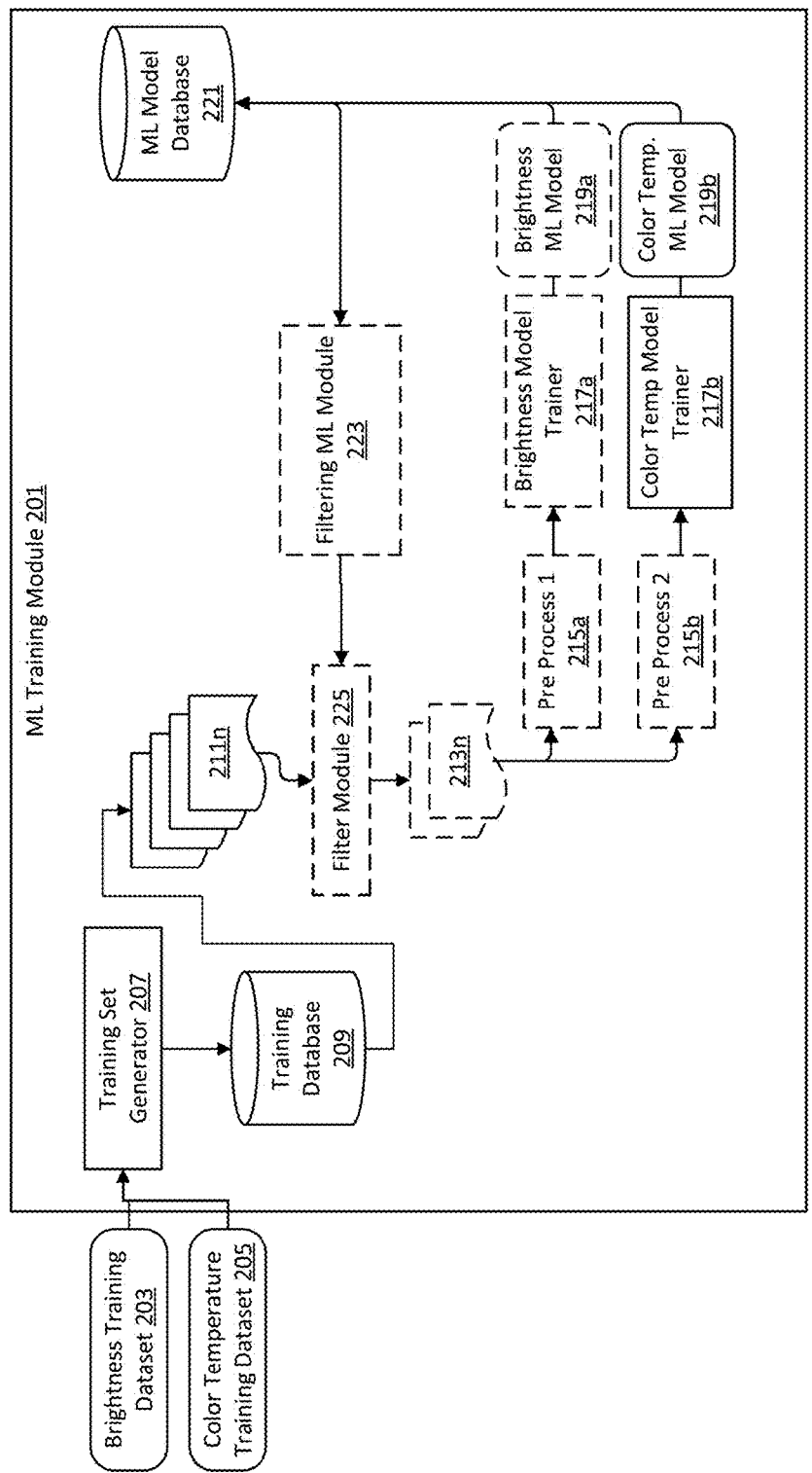
FIG. 2 is a block diagram illustrating a system for training machine learning models to detect change in a brightness and color temperature on the face of a user in a video according to aspects of the present disclosure.

FIG. 2 is a block diagram illustrating a system training machine learning models to detect change in a brightness and color temperature on the face of a user in a video according to aspects of the present disclosure. As shown in example 200, a ML training module 201 is configured to build and train specialized machine learning models with inference to perform particular tasks. This enables the specialized machine learning models to develop an ability to perform particular objectives on inputs that are not part of a training dataset. By subjecting the specialized machine learning models to large amounts of unlabeled and/or labeled trained image data sets, the specialized machine learning models may perform particular tasks such as detecting changes in color parameters in videos.

Supervised learning is effective for tasks such as classification (assigning inputs to predefined categories) and regression (predicting continuous values) since it relies on the availability of labeled data for both training and evaluation phases. In supervised learning, the ML training module 201 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the ML training module 201 provides the algorithm with a training dataset including input-output pairs. The algorithm learns the mapping function that relates inputs to outputs through an iterative process, adjusting its internal parameters based on the provided examples. During model building, the algorithm creates a model that can generalize from the training data to make predictions on new, unseen data. The model's complexity varies based on the algorithm used. For example, the model may be a simple linear regression model or a complex neural network. During the prediction phase, the ML training module 201 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the ML training module 201 includes at least a training database 209 configured to store the raw training data 211n and corresponding labels, a ML model database 221 to store the trained models (e.g., brightness ML model 219a, color temperature ML model 219b). In some aspects, the ML training module 201 may include an optional filtering machine learning model 223 and a filter module 225 configured to filter data from the training database 209 for training by removing poorly generated training data.

Training data from the brightness training dataset 203, and the color temperature training dataset 205 is received into the ML training module 201 via the training set generator 207. In some aspects, the brightness training dataset 203 includes videos of faces of people under different lighting conditions. In some aspects, the color temperature training dataset 205 videos of faces of people under different lighting conditions and color temperatures.

An optional filter module 225 is configured to filter out bad training images and/or data in order to clean up the training data in the training dataset 211n. In some examples, the filter module 225 may be a neural network. In some examples, the filter module 225 is a mathematical model. In some examples, the cleaned training dataset 213n then undergoes optional preprocessing steps depending on which neural network or model is being trained.

The optional preprocess 1 215a, and preprocess 2 215b are automated processes that modify the raw data received from 211n (or cleaned training dataset 213n) and prepare the raw data as input to the respective model trainers (e.g., a brightness model trainer 217a or color temperature model trainer 217b). These may be described in the ML training module 201 as snippets of code that prepares the datasets. In some examples, the preprocessing module (e.g., preprocess 1 215a and preprocess 2 215b) for a particular trainer may be an automated script or code that will be setup the first time any model is trained.

The brightness model trainer 217a and the color temperature model trainer 217b are the scripts or code that train the respective models. The brightness model trainer 217a and the color temperature model trainer 217b may be a script or code that holds the instructions on how a model should be trained (e.g., optimization method, model architecture, dataset division, etc.) and also runs the training. The brightness model trainer 217a and the color temperature model trainer 217b each take as input the raw or filtered processed training data and train the brightness model trainer 217a and the color temperature model trainer 217b to achieve their specific objectives, respectively.

In summary, the raw dataset 211n or cleaned dataset 213n may optionally go through different preprocessing steps 215a and 215b and then a corresponding brightness model trainer 217a and color temperature model trainer 217b to generate a trained brightness ML model 219a and a color temperature ML model 219b. In some examples, each of these models may be a neural network.

As a non-limiting example and as discussed above, the machine learning may be a neural network. The neural network models are designed using a set of hyperparameters that define high-level aspects of their architecture and training process. These hyperparameters include, but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 211n used for training may include noise and bad training images from the training database 209. Accordingly, to create a clean and filtered training dataset, the filter module 225 is configured to filter out unwanted data points from the raw training dataset 211n by developing smaller, less accurate systems based on patterns and metadata information.

During the training process, the brightness model trainer 217a and the color temperature model trainer 217b (e.g., neural networks) are presented with input data and labels of actual values, and the optimization objective, which aims to minimize the difference between the actual value and the predicted value, is calculated. The optimization algorithm updates the parameters of the brightness model trainer 217a and the color temperature model trainer 217b to reduce the value of the objective. This process is repeated for several iterations until the parameters do not change anymore. This process is repeated for various combinations of hyperparameters, and the model with the smallest label prediction error is selected as the final model.

When a new model (e.g., a trained brightness ML model 219a, and a color temperature ML model 219b) is created, and a new process for filtering and automated labeling is established, it is added to the ML model database 221 in the ML training module 201. This enables the new model to be part of the closed-loop model update process. Optionally, at regular intervals, data which is continuously collected can be filtered, labeled, and used to update old models by an optional filtering machine learning module 223. In some examples, the filtering machine learning module 223 is a neural network. In some examples, the filtering machine learning module 223 is a mathematical model. This approach may capture changes in the data over time.

FIGS. 3A-3E are diagrams illustrating a method for detecting cheating by a user taking an online examination based on face detection according to aspects of the present disclosure. Examples 300a-300e illustrates an environment in which a camera 101 is capturing video of a person (e.g., user A 105) taking an online examination on a computing device 103 while examples 301a-301e illustrate corresponding video clips of the user captured by the camera 101.

Figure 3A:
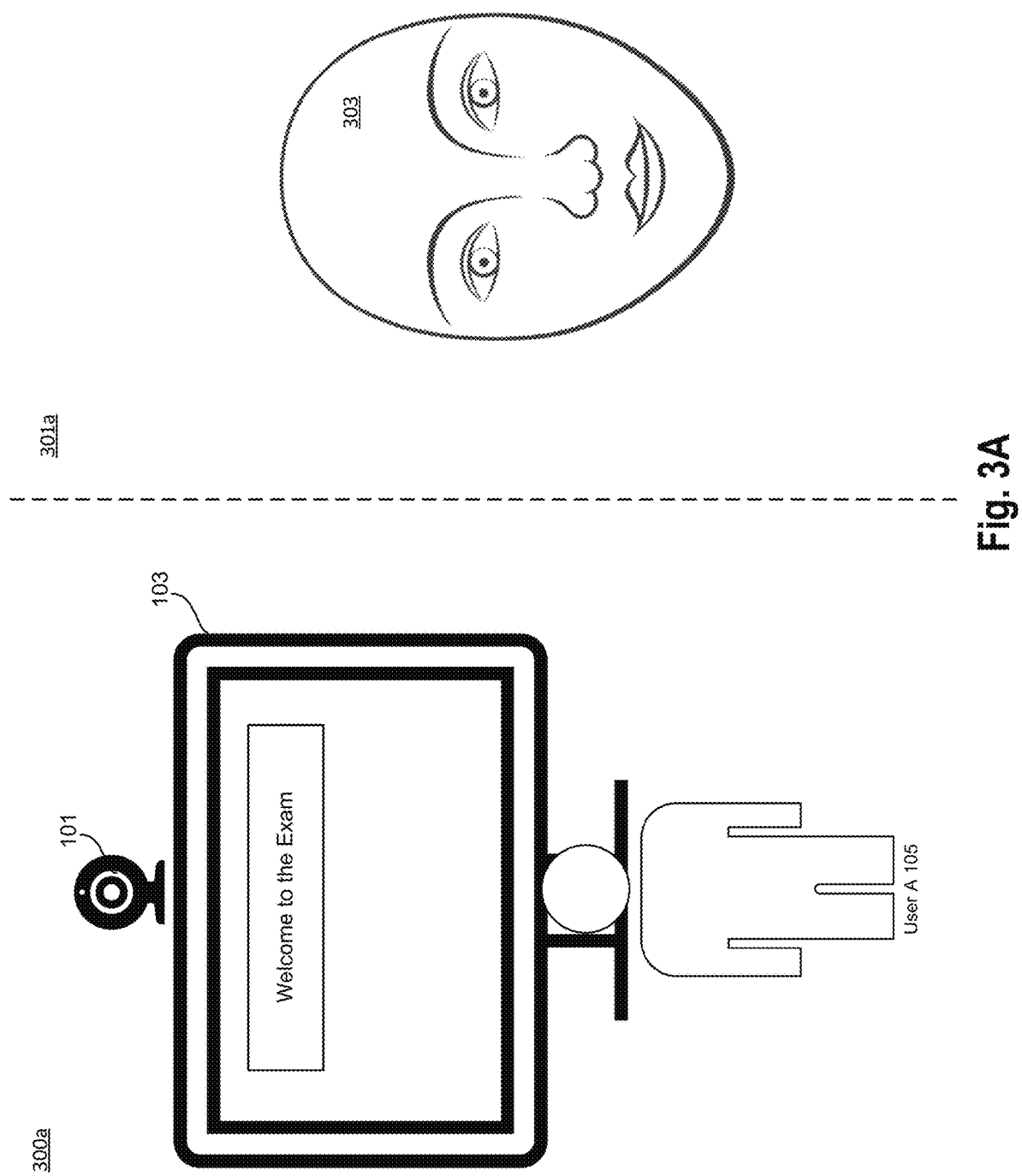
FIGS. 3A-3E are diagrams illustrating a method for detecting cheating by a user taking an online examination based on face detection according to aspects of the present disclosure.

As shown in example 300a and 301a of FIG. 3A, the user A 105 begins taking an online examination administered on the computing device 103. In addition, a camera 101 may be coupled to the computing device 103 and is configured to capture video of the user A 105 while the user is taking the exam. As shown in example 301a, the captured video will capture at least the face of the user A 105 during the online examination in real-time (or near real-time). In some aspects, the face of the user A 105 may be cropped out.

Figure 3B:
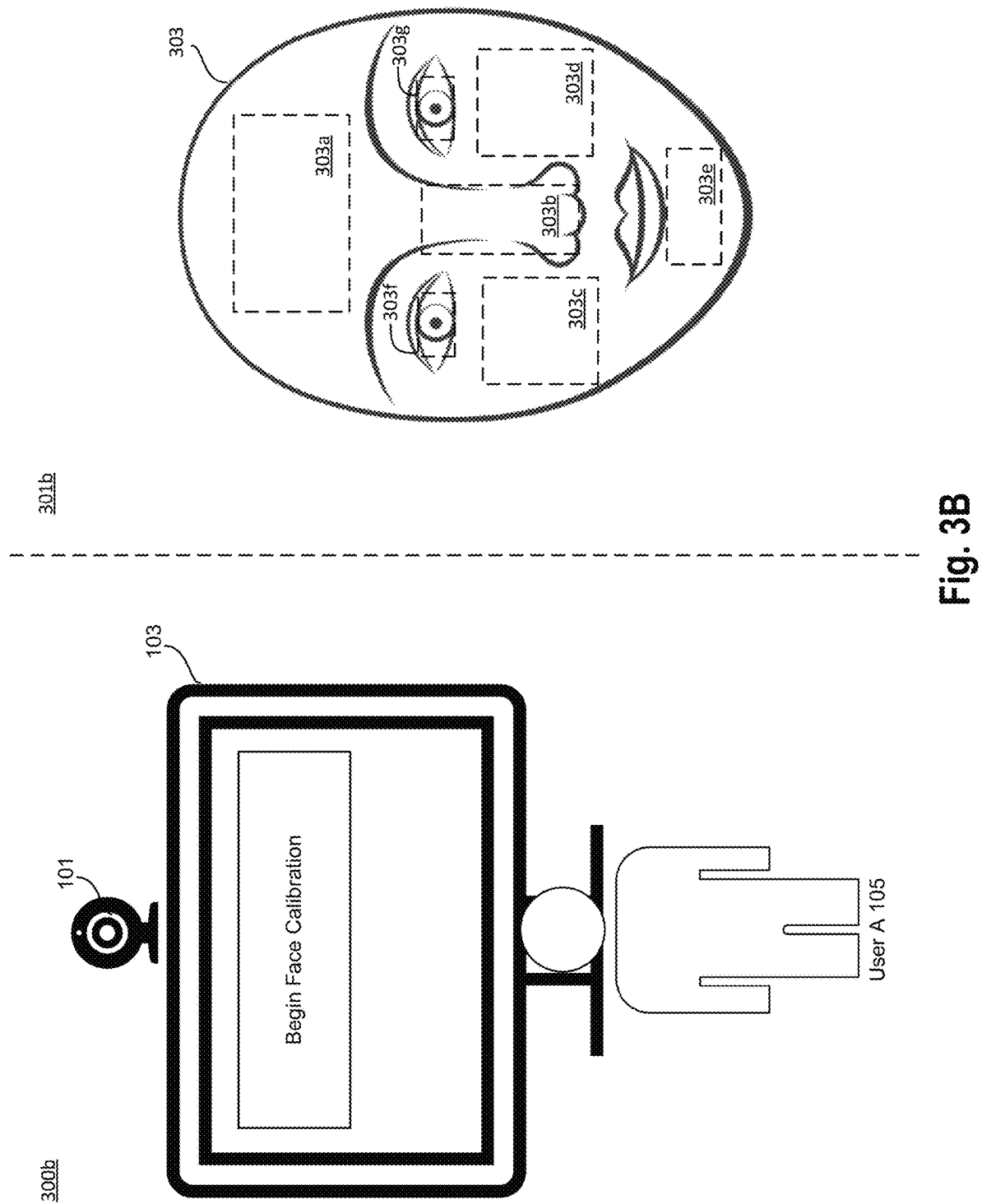

As shown in example 300b and 301b of FIG. 3B, the user may begin an optional face calibration process to determine a brightness and/or color temperature baseline by measuring a brightness and/or color temperature of the face of the user while the computing device 103 does not display any colored shapes. As shown in example 300b, the face of the user may be captured in a video clip while there are no colored shapes displayed on the screen as a baseline measurement. In addition, as shown in example 301b, the obtained video clip showing the face of the user may be cropped into different portions of the face 303 including at least a left eye 303g, a right eye 303f, a portion of a forehead 303a, a left cheekbone 303d, a right cheekbone 303c, a nose bridge 303b, or a chin 303e. These portions of the video clip may each be measured and detected for brightness changes or color temperature changes during the online examination process. It should be noted that these particular portions are for illustrative purposes only and that any other portion of a face may be used in the present disclosure.

Figure 3C:
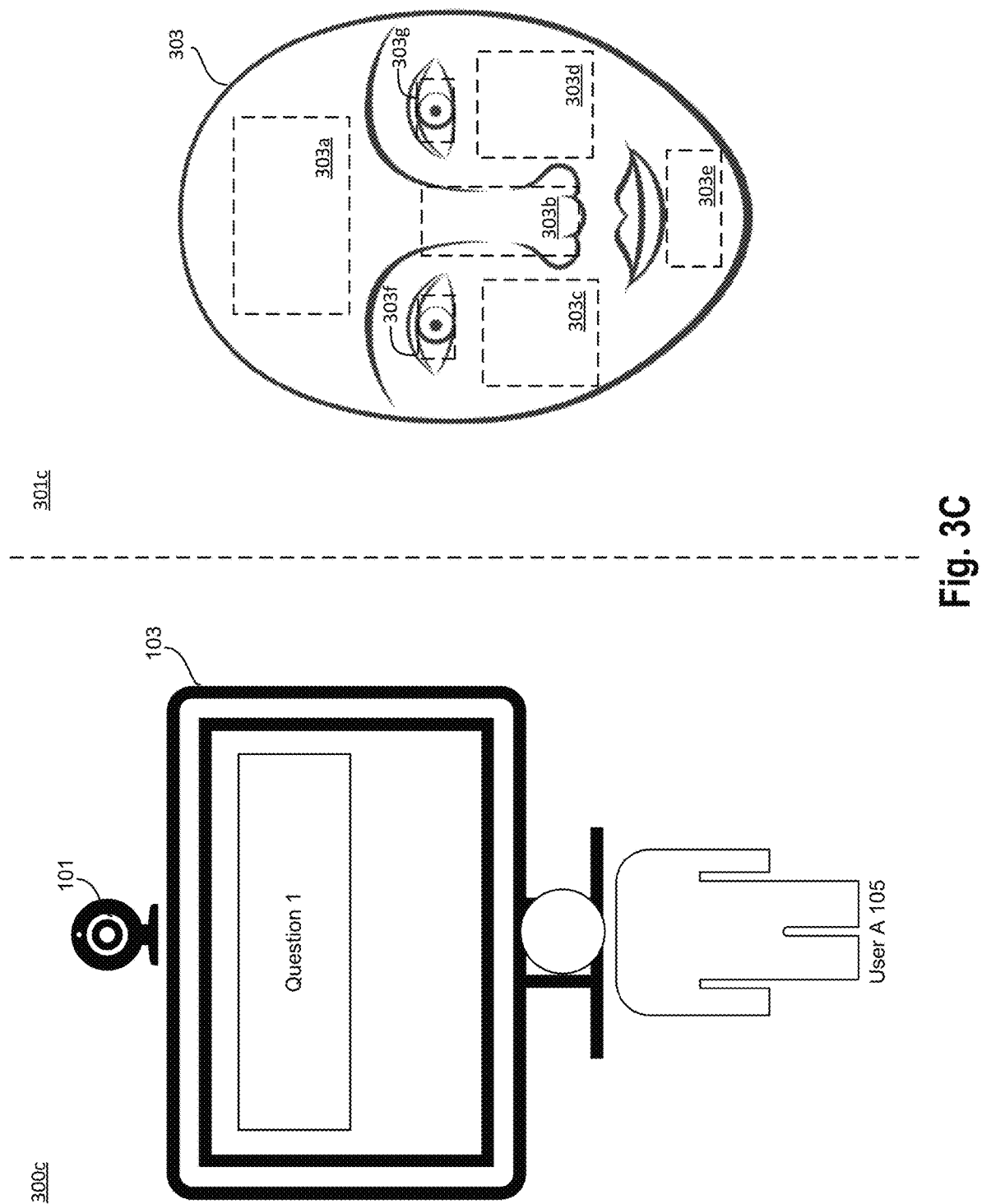

As shown in example 300c and 301c of FIG. 3C, the user A 105 may begin taking the online examination on the computing device 103 while the camera 101 is monitoring the user A 105. As shown in example 301c, the brightness and color temperatures of each of the different portions including at least a left eye 303g, a right eye 303f, a portion of a forehead 303a, a left cheekbone 303d, a right cheekbone 303c, a nose bridge 303b, or a chin 303e is monitored and measured during the online examination. If the optional calibration process is not performed, then the brightness and color temperatures of each of the different portions including at least a left eye 303g, a right eye 303f, a portion of a forehead 303a, a left cheekbone 303d, a right cheekbone 303c, a nose bridge 303b, or a chin 303e may be utilized as the baseline measurements during any time period that the colored shapes are not displayed on the display.

Figure 3D:
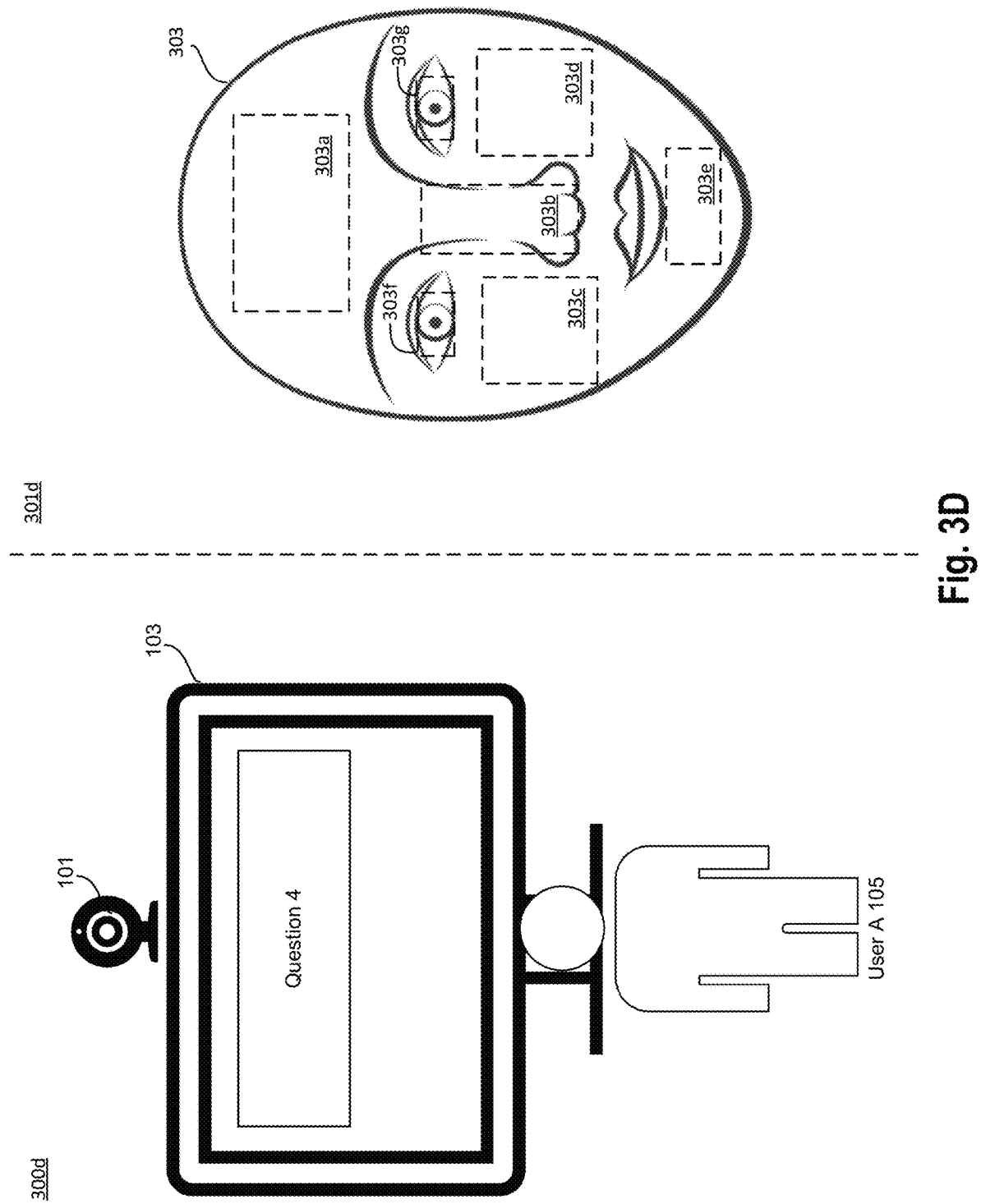

As shown in example 300d and 301d of FIG. 3D, the user will be monitored and captured by the camera 101 during the entire online examination process in order to detect any changes in brightness and color temperatures of each of the different portions including at least a left eye 303g, a right eye 303f, a portion of a forehead 303a, a left cheekbone 303d, a right cheekbone 303c, a nose bridge 303b, or a chin 303e in the video.

Figure 3E:
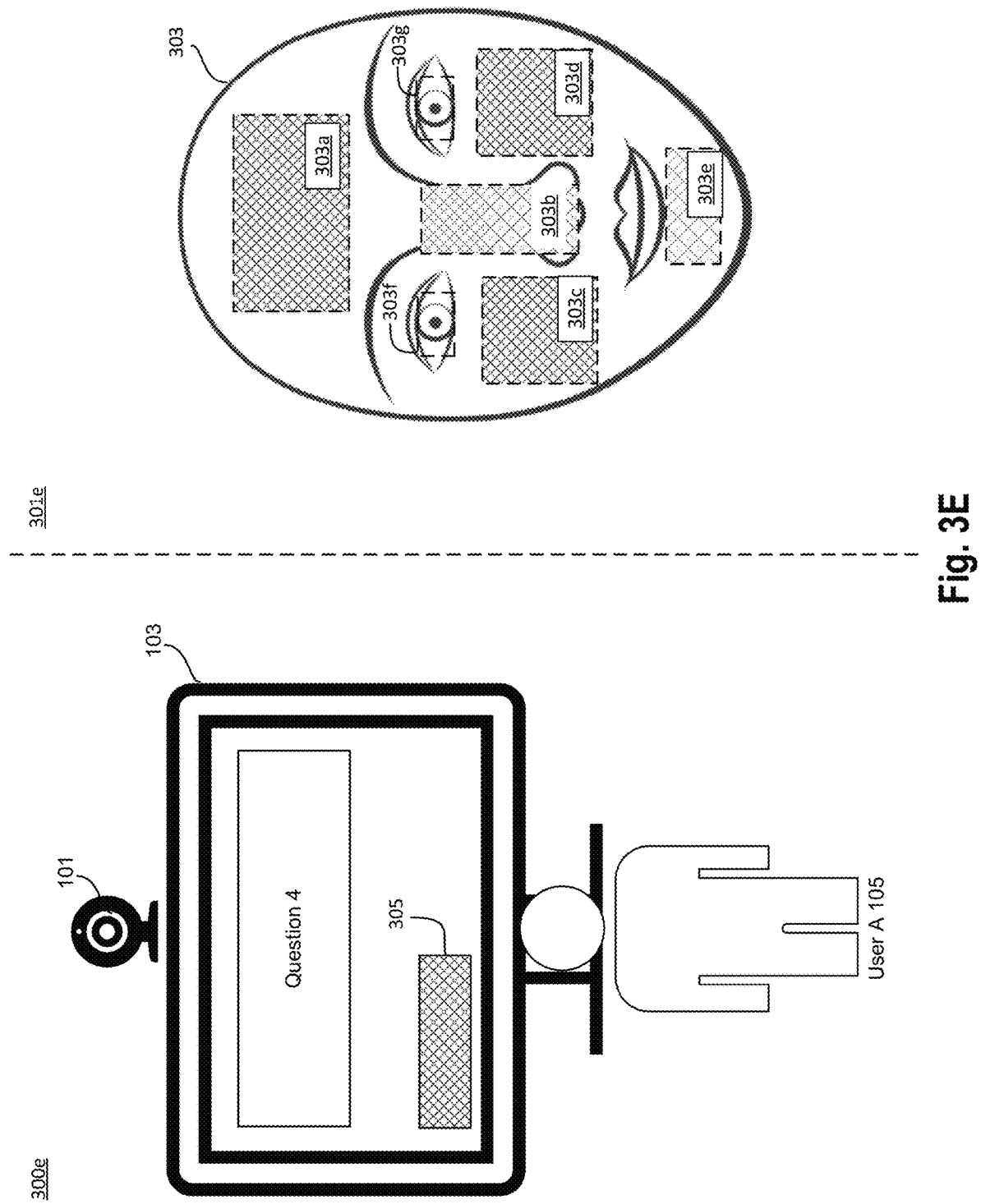

As shown in example 300e and 301e of FIG. 3E, a colored shape 305 (e.g., object 107 shown in FIG. 1) may be displayed on the display of the computing device 103. The idea is that the colored shape 305 will introduce a sharp brightness and/or color temperature difference that will be reflected off the face of the user A 105. Accordingly, the video of the user A 105 should capture the change in brightness and/or color temperature in response to the user viewing or seeing the colored shape 305 on the display. As shown in example 301e, at least one of the different portions including at least a left eye 303g, a right eye 303f, a portion of a forehead 303a, a left cheekbone 303d, a right cheekbone 303c, a nose bridge 303b, or a chin 303e will measure a difference in brightness or color temperature as compared to the videos from FIG. 3A-3D due to the appearance of the new colored shape. In this way, the present disclosure describes a way of determining if the user A 105 in front of the camera 101 is actually the person in front of the display on the computing device 103 taking the examination by ensuring that the video of the user A 105 will capture any differences in brightness and/or color temperature due to the colored shapes that are displayed on the computing device 103.

Although FIGS. 3A-3E are presented in the context of a user taking an online examination, it should be noted that the application of present disclosure in the context of an online examination is for illustrative purposes only. The present disclosure may apply to any other application of online identification verification that involves detecting a presence of a person in front of a display with a camera based on a reflection detection. For example, this may include protecting against real-time "deepfakes" where an impersonator is overlaying a computer-generated face and pretending to be someone else. As another example, the present disclosure may also be applied to ATMs and any other security cases that require an identification based on facial recognition.

Figure 4A:
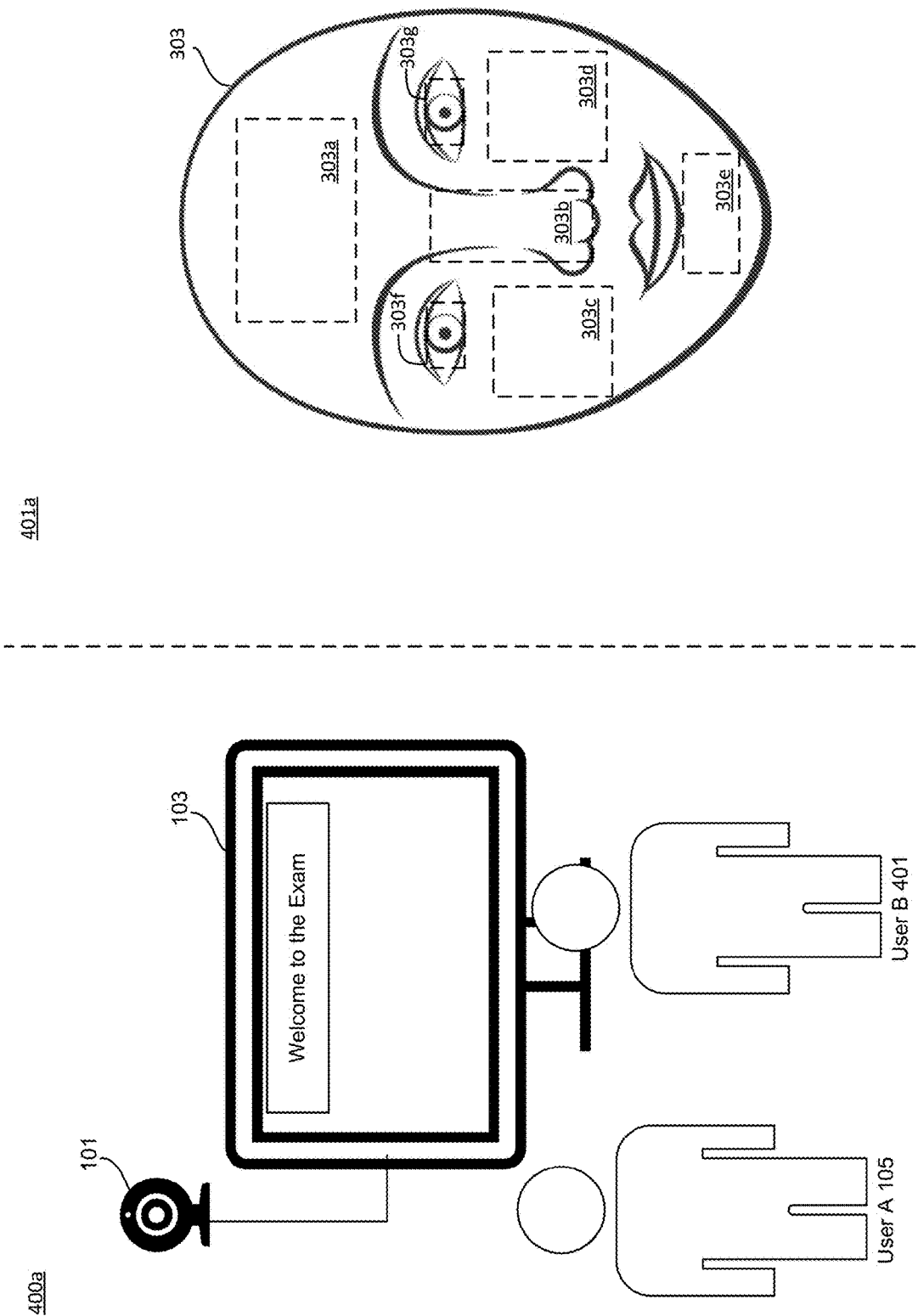
FIGS. 4A-4C are diagrams illustrating a method for detecting a cheating attempt by a user taking an online examination based on face detection according to aspects of the present disclosure.
Figure 4B:
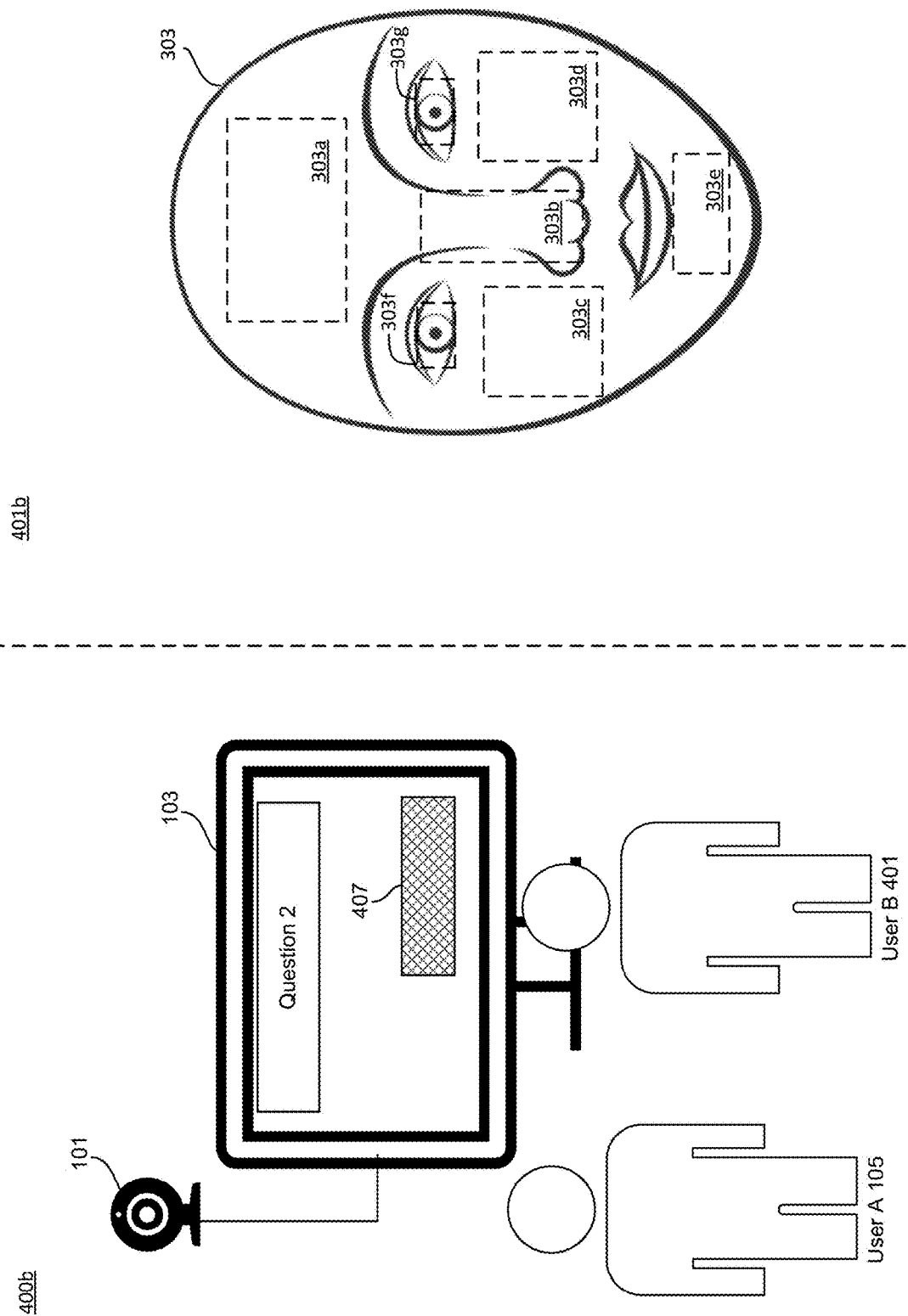
Figure 4C:
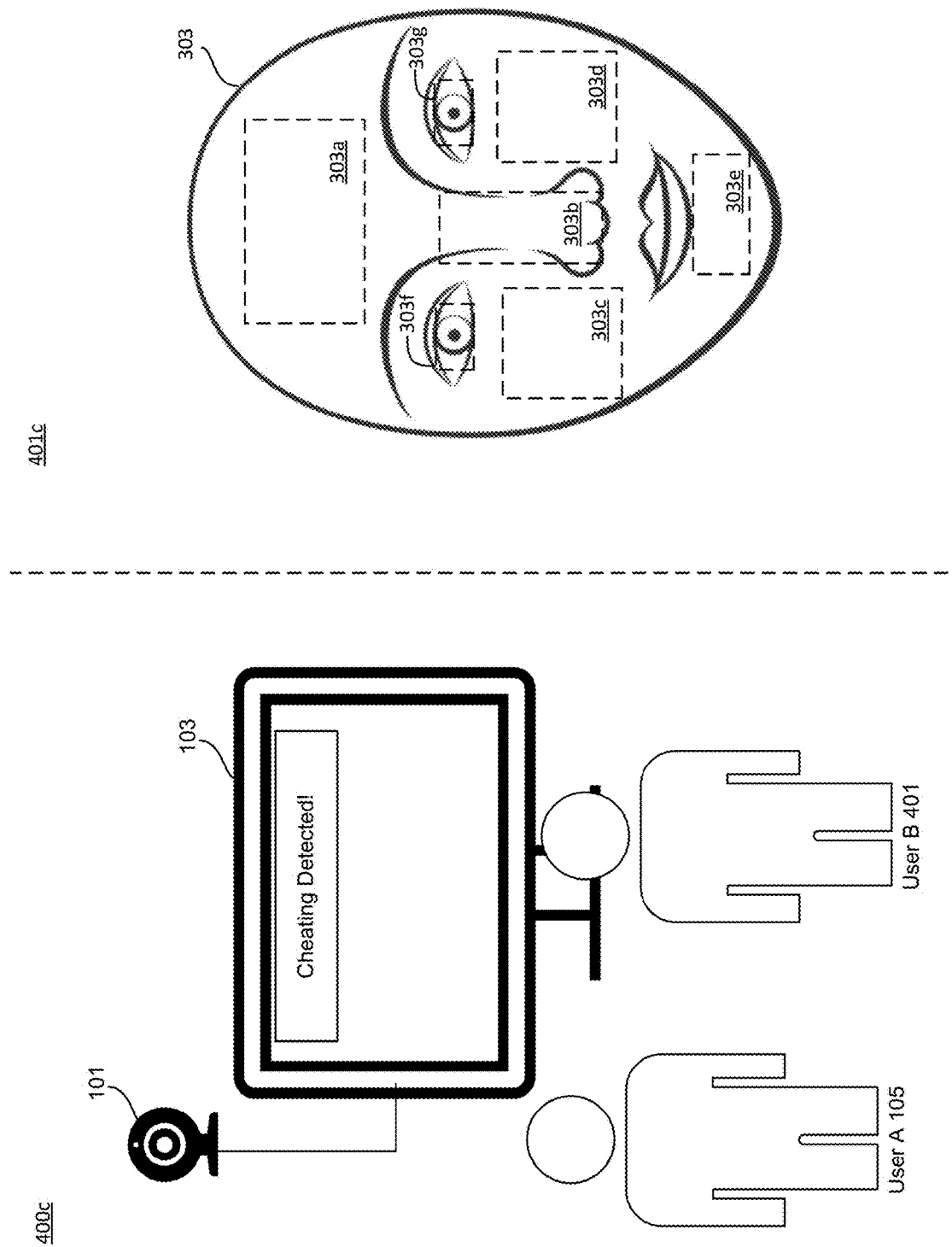

FIGS. 4A-4C are diagrams illustrating a method for detecting a cheating attempt by a user taking an online examination based on face detection according to aspects of the present disclosure. Examples 400a-400c illustrates an environment in which a camera 101 is capturing video of a person (e.g., user A 105) taking an online examination on a computing device 103 while examples 401a-401c illustrate corresponding video clips of the user captured by the camera 101. In contrast to examples 300a-300e shown in FIGS. 3A-3E, FIG. 4A-4C illustrate user A 105 attempting to cheat on the examination by having user B 401 take the examination on the computing device 103 while the camera is directed toward user A 105.

As shown in example 400a and 401a of FIG. 4A, two users (e.g., user A 105 and user B 401) may be acting in concert to cheat on an online examination. The cheating event includes user B 401 cheating for user A 105 by having user B 401 taking the online examination on the computing device 103 while user A 105 pretends to take the online examination by sitting in front of the camera 101. As shown in example 401a, the camera 101 is capturing the face of the user A 105 (and not user B 401) in real time since user A 105 is the person who should be taking the online examination on the computing device 103. In some aspects, the video of the user A 105 may be cropped into different portions including at least a left eye 303g, a right eye 303f, a portion of a forehead 303a, a left cheekbone 303d, a right cheekbone 303c, a nose bridge 303b, or a chin 303e is such that each portion is monitored and measured during the online examination.

As shown in example 400b and 401b of FIG. 4B, the computing device 103 generates and displays a colored shape 407 during the online examination to verify whether the camera 101 is correctly monitoring the person who is taking the online examination on the computing device 103 (e.g., detect any cheating events). However, since user B 401 is in front of the computer display screen and not user A 105, the videos monitoring the face of user A 105 will not capture the reflection of the colored shape 407 displayed on the computing device 103 since the reflection of the colored shape 407 will only be seen on the face of user B 401 and not user A 104. As shown in example 401b of FIG. 4B, none of the different portions of the face of user A 105 will reflect a change due to the colored shape 407 being displayed on the computing device 103. Instead, the change in brightness and/or color temperature will be reflected n the face of user B 401 since user B 401 is in front of the display of the computing device 103.

As shown in example 400c and 401c of FIG. 4C, the computing device 103 displays a message that a cheating event has been detected based on a determination that the obtained changes in brightness and color temperature of surfaces on the face of the user does not correspond to the brightness and color temperature of the colored shape within the brightness threshold and the color temperature threshold.

Although FIGS. 4A-4C are presented in the context of a user taking an online examination, it should be noted that the application of present disclosure in the context of an online examination is for illustrative purposes only. The present disclosure may apply to any other application of online identification verification that involves detecting a presence of a person in front of a display with a camera based on a reflection detection. For example, this may include protecting against real-time "deepfakes" where an impersonator is overlaying a computer-generated face and pretending to be someone else. As another example, the present disclosure may also be applied to ATMs and any other security cases that require an identification based on facial recognition.

Figure 5:
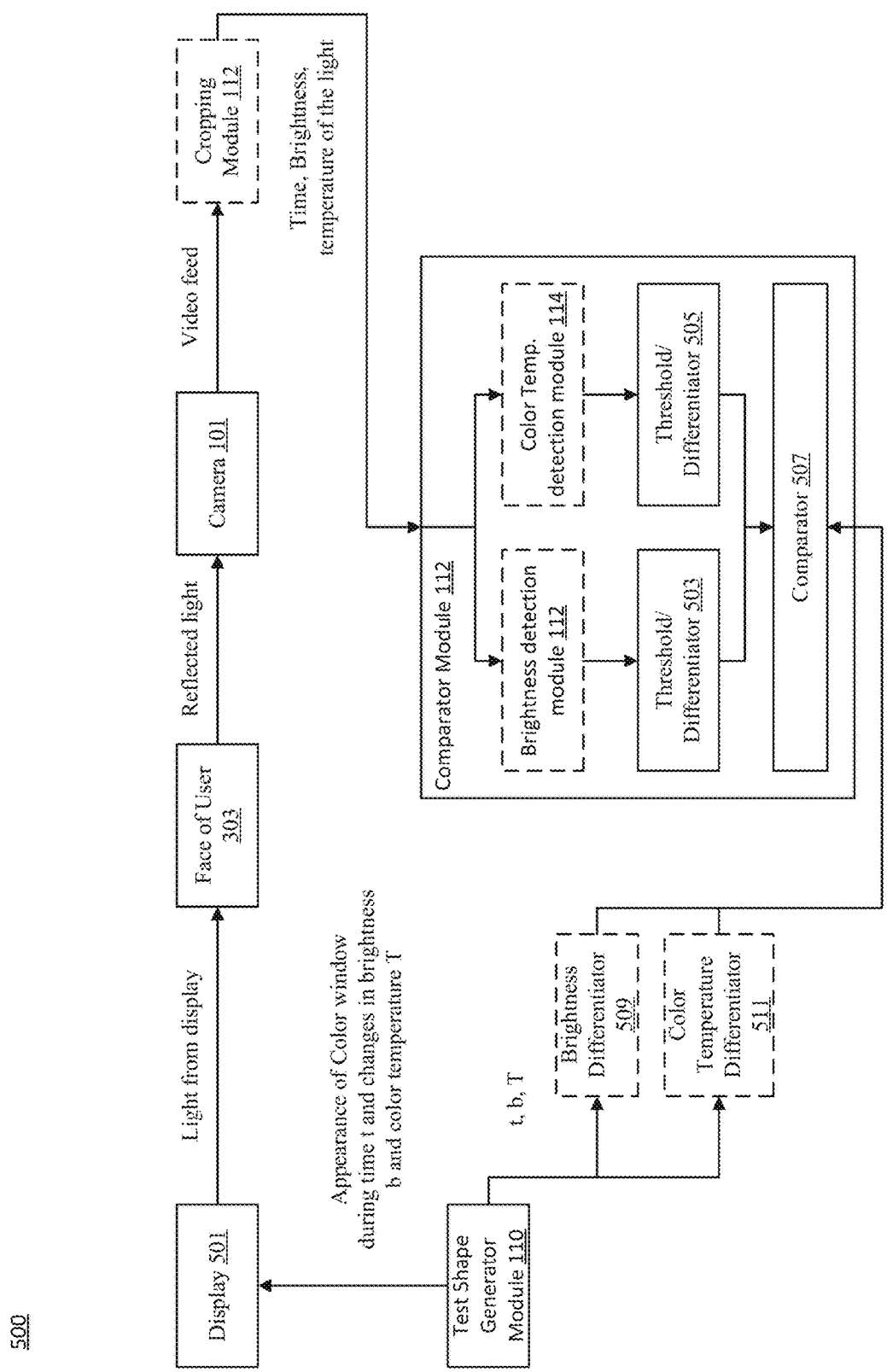
FIG. 5 is an example method for implementing a personal presence control system for detecting a presence of a person in front of a display with a camera based on a reflection detection according to an aspect of the present disclosure.

FIG. 5 is an example method of implementing a personal presence control system for detecting a presence of a person in front of a display with a camera based on a reflection detection according to an aspect of the present disclosure.

As shown in example 500, the test shape generator module 110 generates a colored shape (e.g., the object 107 shown in FIG. 1) for display 501 on a computing device (e.g. computing device 103 shown in FIG. 1) while the user is present in an online session on the computing device. In some aspects, the test shape generator module 110 may be coupled to brightness differentiator 509 and a color temperature differentiator 511. The brightness differentiator 509 may be a technique or metric used to quantify and distinguish differences in brightness levels between different images. The color temperature differentiator 511 may be a technique or metric used to quantify and distinguish differences in color temperatures between different images.

The light from the display may be measured on the face 303 of the user from video feed of the user viewing the display 501 as monitored and captured by a camera 101. In some aspects, a cropping module 112 may crop out the face of the user from the video feed. In some aspects, the cropping module 112 may crop out the torso of the user from the video feed. In this way, the comparator module 116 may focus on detecting changes in brightness or color temperature of the light in areas such as particular portions of the face of a user (e.g., at least a left eye 303g, a right eye 303f, a portion of a forehead 303a, a left cheekbone 303d, a right cheekbone 303c, a nose bridge 303b, or a chin 303e shown in FIGS. 3A-4C) since those portions are most likely to be measurable and affected by the reflected light of the colored shape.

In some aspects, a comparator module 116 may include a brightness detection module 122, a color temperature detection module 124, a respective brightness threshold/differentiator 503, a color temperature threshold/differentiator 505, and a comparator 507. Generally, the comparator module 116 is configured to detect changes in brightness or color temperature of a face of a user in response to changes in displayed shapes and/or colors on the display 501.

In some aspects, the comparator module 116 correspond to a floating window method that is utilizes autoencoders to implement a technique in which a small, movable window (or patch) of data is analyzed using the autoencoders to detect anomalies or changes within a lager dataset (e.g., image or video). The comparator module 116 may include a supervised autoencoder configured to detect changes in brightness, a supervised autoencoder configured to detect changes in color temperature, a respective brightness threshold/differentiator 503, a color temperature threshold/differentiator 505, and a comparator 507. The autoencoder is a type of neural network used to learn efficient coding of input data and may consist of two main parts: an encoder configured to compress the input into a latent-space representation and a decoder configured to reconstruct the input from the latent space. A floating window may be a small, movable window that slides over the lager dataset and is configured to capture a subset of the data at each position, which is then analyzed by the autoencoder.

To adapt the autoencoder for supervised learning, the loss function should be modified to include a supervised component. This means that, in addition to minimizing the reconstruction error, the network also minimizes the error between the predicted and actual labels. In other words, to detect changes in brightness and color from videos using the autoencoder in a supervised setting, the autoencoder is trained to reconstruct frames of the video and then use the reconstruction loss (e.g., the difference between the input and the reconstructed frame) to detect anomalies such as changes in brightness or color during the online session.

In some aspects, the comparator module 116 corresponds to a supervised SIAMESE configured to detect changes in brightness and color temperature by learning to compare pairs of images and outputting a similarity score. By training the network with labeled pairs of images, it can learn to recognize significant changes in brightness or color temperature. In this embodiment, the comparator module 116 may include a supervised autoencoder configured to detect changes in brightness, a brightness threshold/differentiator 503, a supervised autoencoder configured to detect changes in color temperature, a color temperature threshold/differentiator 505, and a comparator 507. In this embodiment, the SIAMESE network leverages the architecture to compare frames from different points in the video and measures their similarity. The idea is to train the model to understand what normal changes in brightness and color look like and then use it to identify when those changes exceed normal variations, indicating an anomaly or significant change.

Following on the SIAMESE model embodiment, the comparator module 116 may input pairs of frames into the comparator module 116. In a supervised setup, these pairs are labeled as either "similar" (e.g., no significant change in brightness or color) or "different" (e.g., noticeable change in brightness or color). In some aspects, the SIAMESE network consists of two identical sub-networks (e.g., weight shared CNNs) that extract feature representations from the two input frames. These representations are then compared using a distance metric (e.g., Euclidean distance or cosine similarity) to determine the level of similarity between the two frames. In some aspects, a loss function for the Siamese networks may be the contrastive loss or triples loss, which encourages the network to output similar embeddings for "similar" pairs and distant embeddings for "different" pairs. The network will be trained on pairs of frames with labeled differences. During training, the network learns to differentiate between frames that have changes in brightness and color and those that do not. Once trained, the network can compare embeddings of video frames to detect changes in brightness and color based on a threshold of the distance between embeddings. If the score indicates a significant difference, then it may be detected as a change in brightness or color temperature.

Figure 6:
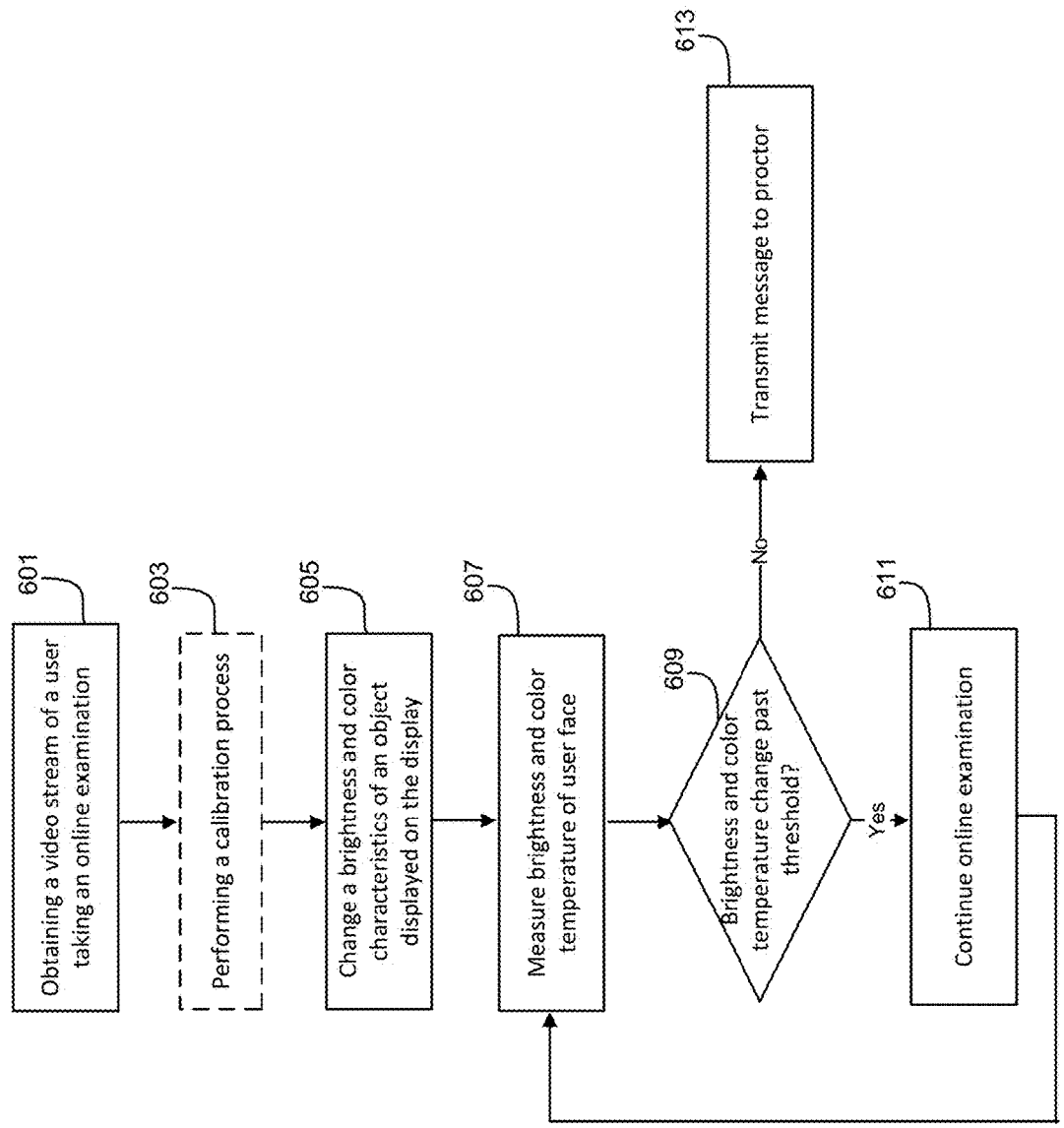
FIG. 6 is an example method for detecting a presence of a person in front of a display with a camera based on a reflection detection according to aspects of the present disclosure.

FIG. 6 is an example method for detecting a presence of a person in front of a display with a camera based on a reflection detection according to aspects of the present disclosure. In various implementations, the method 600 is performed by a device with one or more processors and non-transitory memory that performs intent prediction. In some implementations, the method 600 is performed by processing logic, including hardware, firmware, software, or a combination thereof. In some implementations, the method 600 is performed by a processor executing code stored in a non-transitory computer-readable medium (e.g., a memory). The method 600 describes a method detecting a presence of a person in front of a display with a camera based on a reflection detection.

At 601, the method 600 includes obtaining, using a camera pointed at a user, a video stream of a user in front of the display. As an example, referring back to FIG. 1, the camera 101 may be pointed at the user A 105 present in the online session on a computing device 103. As another example, referring back to FIG. 3A, the camera 101 may be monitoring the user A 105 taking the online examination on a computing device 103. As another example, the camera 101 may be pointed at a user who is using a computer in any online setting where the user's identity is being verified or checked based on face detection using a camera. Following on the previous example, a user may pretend to be someone else by using a deepfake to appear as though someone else is in front of the computer.

Optionally, at 603, the method 600 includes before displaying the object, performing an calibration of the brightness and color temperature of the surfaces on the face of the user by obtaining the brightness and the color temperature of the at least one surface on the face of the user from the obtained video stream as a baseline measurement. As an example, referring back to FIG. 3B, the computing device 103 may perform a calibration of the brightness and color temperature of the surfaces of the face 303 of the user A 105 before any colored shapes are displayed on the monitor.

At 605, the method 600 includes changing, on the display of a computer, a brightness and color characteristics of an object displayed on the display. In some aspects, the object may be a colored shape. As an example, referring back to FIG. 3C, the computing device 103 may display a colored shape 305 with a brightness and a color different from any other shapes displayed on the computing device 103.

In some aspects, changing the brightness and color characteristics of the object displayed on the display is based at least in part on pulse-width modulation techniques or other modulation techniques. In some aspects, modulation techniques may be used to change the brightness and color of an object on a display by manipulating the pixel values in specific ways. For example, the brightness of an object may be modulated by increasing or decreasing the Red, Green, Blue (RGB) values of a pixel. As another example, special modulation can vary brightness over time, creating effects such as flickering or pulsing. As another example, the color of the object may be modulated by changing the hue and saturation. For example, the RGB values may be converted to an alternative color space such as Hue, Saturation, and Value, the hue may be modified to shift color, and/or the saturation may be adjusted to make the colors more vivid or muted. As yet another example, frequency-based modulation may be utilized to change color components cyclically using mathematical functions to create dynamic, time-varying color shirts. Furthermore, both brightness and color can be modulated together for more complex effects. For example, brightness may follow a slower modulation frequency and/or color may cycle faster or follow a separate pattern. In addition, pulse-wide modulation (PWM) may adjust the duty cycle of light-emitting elements to simulate different brightness levels. For color displays, this may be combined with sub-pixel control to alter color perception.

In some aspects, the object may correspond to at least one of: a blue shape, a red shape, a yellow shape, a white shape, a shape with multiple colors, or a shadowed screen. In this way, if the colored shape is displayed at a known time, then the changes in brightness and/or color temperature of the reflection of the displayed color shape may be detected in the obtained video of the user viewing the colored shape displayed on the computing device.

In some aspects, the method 600 may include displaying the colored shape on the display of the computer at an initial brightness and color; changing the brightness and color during a time period; and in response to displaying the colored shape during the time period, obtaining the changes in the brightness and the color of surfaces on a face of the user from the obtained video stream from the same time period. In this way, a colored shape with parameters that change over a specific time period provides additional protection against false positive detections and allows for more sensitive detection in noisy conditions. In this case, not only will a surge in brightness or color temperature be monitored and detected, but an exact pattern of the changes in brightness and color over time may be monitored and detected.

In some aspects, the method 600 may further include cropping portions of the face of the user from the obtained video stream, wherein the cropped portions correspond to surfaces of at least a left eye, a right eye, a portion of a forehead, a left cheekbone, a right cheekbone, a nose bridge, or a chin, and, in response to changing the brightness and color characteristics of the object displayed on the display, obtaining changes in the brightness and the color temperature of at least one of the cropped surfaces on the face of the user from the video stream. As an example, referring back to FIG. 3B, the obtained video clip showing the face of the user may be cropped into different portions of the face including at least a left eye 303g, a right eye 303f, a portion of a forehead 303a, a left cheekbone 303d, a right cheekbone 303c, a nose bridge 303b, or a chin 303e.

At 607, the method 600 includes in response to changing the brightness and color characteristics of the object displayed on the display, obtaining changes in a brightness and a color temperature of at least one surface on a face of the user from the video stream.

At 609, the method 600 includes determining whether the obtained changes in brightness and color temperature of the surfaces on the face of the user correspond to the brightness and color temperature of the colored shape within a brightness threshold and a color temperature threshold. As an example, referring back to FIG. 5, the comparator module 116 may be configured to determine changes in brightness and color temperature on the face of the user in response to displaying colored shapes on the display 501.

In some aspects, determining whether the obtained changes in brightness and color temperature of the surfaces on the face of the user correspond to the brightness and color temperature of the colored shape within the brightness threshold and the color temperature threshold using a trained machine learning model. In some aspects, the machine learning model is trained by: training the machine learning model to determine changes in the brightness and the color temperature on the surfaces on the face of the user using a labeled dataset containing videos of faces of people under different lighting conditions and varying color temperatures. In some aspects, the machine learning model corresponds to a SIAMESE neural network, a regression model, an autoencoder with supervised loss, and a convolutional neural network (CNN) trained to learn spatial patterns.

Based on a determination that the obtained changes in brightness and color temperature of surfaces on the face of the user correspond to the brightness and color temperature of the colored shape within a brightness threshold and a color temperature threshold, then, at 611, the method 600 includes determining that the user is in front of the display and going back to step 607 until the online session is over.

Based on a determination that the obtained changes in brightness and color temperature of surfaces on the face of the user do not correspond to the brightness and color temperature of the colored shape within the brightness threshold and the color temperature threshold, then, at 613, the method 600 includes transmitting a message that the user is not in front of the display. As an example, referring back to FIG. 4B-4C, the computing device 103 determines that the camera 101 is monitoring a different user (e.g., user A 105) than the user actually viewing the display of the computing device 103 and taking the test (e.g., user b 401).

In some aspects, the method 600 may include: based on a determination that the obtained changes in brightness and color temperature of surfaces on the face of the user do not correspond to the brightness and color temperature of the object within the brightness threshold and the color temperature threshold, determining that the user is using a deepfake by generating a computer generated face.

Figure 7:
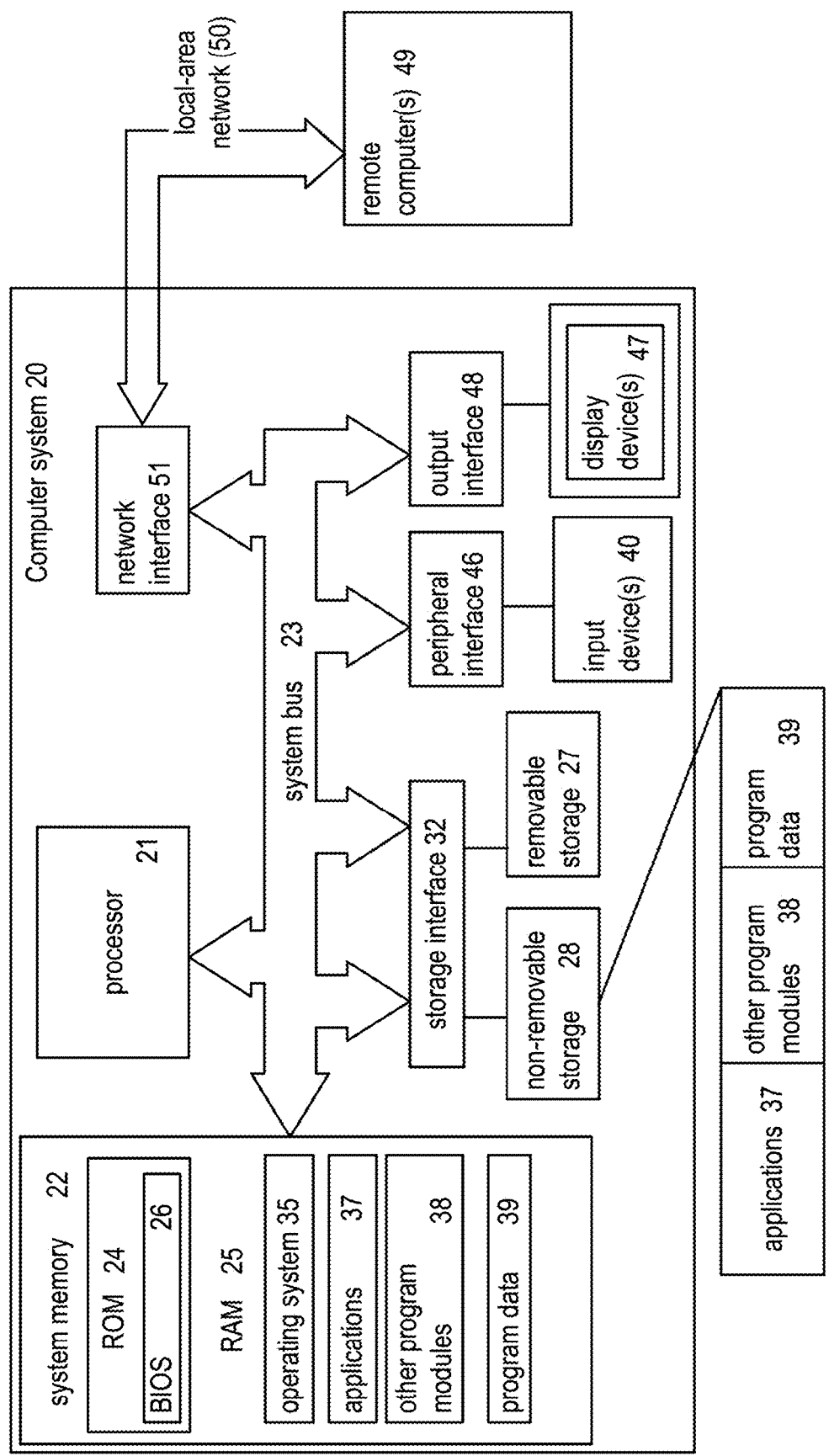
FIG. 7 presents an example of a general-purpose computer system on which aspects of the present disclosure can be implemented.

FIG. 7 is a block diagram illustrating a computer system 20 on which aspects of systems and methods for detecting a cheating attempt by a user taking an online examination based on face detection according to aspects of the present disclosure. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter.

In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for detecting a presence of a person in front of a display with a camera based on a reflection detection, comprising:
   obtaining, using a camera pointed at a user, a video stream of a user in front of the display;
   changing, on the display of a computer, a brightness and color characteristics of an object displayed on the display;
   in response to changing the brightness and color characteristics of the object displayed on the display, obtaining changes in a brightness and a color temperature of at least one surface on a face of the user from the video stream;
   based on a determination that the obtained changes in the brightness and color temperature of surfaces on a face of the user correspond to the brightness and color temperature of the object within a brightness threshold and a color temperature threshold, determining that the user is in front of the display; and
   based on a determination that the obtained changes in brightness and color temperature of surfaces on the face of the user do not correspond to the brightness and color temperature of the object within the brightness threshold and the color temperature threshold, transmitting a message that the user is not in front of the display.

2. The method of claim 1, further comprising:
   cropping portions of the face of the user from the obtained video stream, wherein the cropped portions correspond to surfaces of at least a left eye, a right eye, a portion of a forehead, a left cheekbone, a right cheekbone, a nose bridge, or a chin, and
   in response to changing the brightness and color characteristics of the object displayed on the display, obtaining changes in the brightness and the color temperature of at least one of the cropped surfaces on the face of the user from the video stream.

3. The method of claim 1, further comprising:
   determining whether the obtained changes in brightness and color temperature of the surfaces on the face of the user correspond to the brightness and color temperature of the object within the brightness threshold and the color temperature threshold using a trained machine learning model.

4. The method of claim 3, wherein the machine learning model is trained by:
   training the machine learning model to determine changes in the brightness and the color temperature on the surfaces on the face of the user using a labeled dataset containing videos of faces of people under different lighting conditions and varying color temperatures.

5. The method of claim 3, wherein the machine learning model corresponds to a SIAMESE neural network, a regression model, an autoencoder with supervised loss, and a convolutional neural network (CNN) trained to learn spatial patterns.

6. The method of claim 1, further comprising:
   before displaying the object, performing an calibration of the brightness and color temperature of the surfaces on the face of the user by obtaining the brightness and the color temperature of the at least one surface on the face of the user from the obtained video stream as a baseline measurement.

7. The method of claim 1, further comprising:
   displaying the object on the display of the computer at an initial brightness and color;
   changing the brightness and color during a time period; and
   in response to displaying the object during the time period, obtaining the changes in the brightness and the color of surfaces on a face of the user from the obtained video stream from a same time period.

8. The method of claim 1, wherein the object corresponds to at least one of: a blue shape, a red shape, a yellow shape, a white shape, a shape with multiple colors, or a shadowed screen.

9. The method of claim 1, wherein changing the brightness and color characteristics of the object displayed on the display is based at least in part on pulse-width modulation techniques.

10. The method of claim 1, further comprising:
    based on a determination that the obtained changes in brightness and color temperature of surfaces on the face of the user do not correspond to the brightness and color temperature of the object within the brightness threshold and the color temperature threshold, determining that the user is using a deepfake by generating a computer generated face.

11. A system for detecting of presence of person in front of display with camera based on reflection detection, comprising:
    at least one memory;
    at least one hardware processor coupled with the at least one memory and configured, individually or in combination, to:
      obtain, using a camera pointed at a user, a video stream of a user in front of the display;
      change, on the display of a computer, a brightness and color characteristics of an object displayed on the display;
      in response to changing the brightness and color characteristics of the object displayed on the display, obtain changes in a brightness and a color temperature of at least one surface on a face of the user from the video stream;
      based on a determination that the obtained changes in the brightness and color temperature of surfaces on a face of the user correspond to the brightness and color temperature of the object within a brightness threshold and a color temperature threshold, determine that the user is in front of the display; and
      based on a determination that the obtained changes in brightness and color temperature of surfaces on the face of the user do not correspond to the brightness and color temperature of the object within the brightness threshold and the color temperature threshold, transmit a message that the user is not in front of the display.

12. The system of claim 11, wherein the at least one hardware processor coupled with the at least one memory and is further configured, individually or in combination, to:
    crop portions of the face of the user from the obtained video stream, wherein the cropped portions correspond to surfaces of at least a left eye, a right eye, a portion of a forehead, a left cheekbone, a right cheekbone, a nose bridge, or a chin, and
    in response to changing the brightness and color characteristics of the object displayed on the display, obtain changes in the brightness and the color temperature of at least one of the cropped surfaces on the face of the user from the video stream.

13. The system of claim 11, wherein the at least one hardware processor coupled with the at least one memory and is further configured, individually or in combination, to:
- determine whether the obtained changes in brightness and color temperature of the surfaces on the face of the user correspond to the brightness and color temperature of the object within the brightness threshold and the color temperature threshold using a trained machine learning model.

14. The system of claim 13, wherein the machine learning model is trained by:
- training the machine learning model to determine changes in the brightness and the color temperature on the surfaces on the face of the user using a labeled dataset containing videos of faces of people under different lighting conditions and varying color temperatures.

15. The system of claim 13, wherein the machine learning model corresponds to a SIAMESE neural network, a regression model, an autoencoder with supervised loss, and a convolutional neural network (CNN) trained to learn spatial patterns.

16. The system of claim 11, wherein the at least one hardware processor coupled with the at least one memory and is further configured, individually or in combination, to:
- before displaying the object, performing a calibration of the brightness and color temperature of the surfaces on the face of the user by obtaining the brightness and the color temperature of the at least one surface on the face of the user from the obtained video stream as a baseline measurement.

17. The system of claim 11, wherein the at least one hardware processor coupled with the at least one memory and is further configured, individually or in combination, to:
- display the object on the display of the computer at an initial brightness and color;
- change the brightness and color during a time period; and
- in response to displaying the object during the time period, obtain the changes in the brightness and the color of surfaces on a face of the user from the obtained video stream from a same time period.

18. The system of claim 11, wherein the object corresponds to at least one of: a blue shape, a red shape, a yellow shape, a white shape, a shape with multiple colors, or a shadowed screen.

19. The system of claim 11, wherein changing the brightness and color characteristics of the object displayed on the display is based at least in part on modulation techniques.

20. A non-transitory computer readable medium storing thereon computer executable instructions for detecting of presence of person in front of display with camera based on reflection detection, including instructions for:
- obtaining, using a camera pointed at a user, a video stream of a user in front of the display;
- changing, on the display of a computer, a brightness and color characteristics of an object displayed on the display;
- in response to changing the brightness and color characteristics of the object displayed on the display, obtaining changes in a brightness and a color temperature of at least one surface on a face of the user from the video stream;
- based on a determination that the obtained changes in the brightness and color temperature of surfaces on a face of the user correspond to the brightness and color temperature of the object within a brightness threshold and a color temperature threshold, determining that the user is in front of the display; and
- based on a determination that the obtained changes in brightness and color temperature of surfaces on the face of the user do not correspond to the brightness and color temperature of the object within the brightness threshold and the color temperature threshold, transmitting a message that the user is not in front of the display.

* * * * *